(12) United States Patent
Gruson

(10) Patent No.: US 9,353,905 B2
(45) Date of Patent: *May 31, 2016

(54) CONTAINER HOLDER DEVICE INCLUDING A LEAF SPRING, AND A CONTAINER TREATMENT INSTALLATION INCLUDING SUCH A DEVICE

(71) Applicant: Serac Group, La Ferte Bernard (FR)

(72) Inventor: Bertrand Gruson, Breville sur Mer (FR)

(73) Assignee: Serac Group, La Ferte Bernard (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,183

(22) Filed: Apr. 24, 2014

(65) Prior Publication Data

US 2014/0319301 A1 Oct. 30, 2014

(30) Foreign Application Priority Data

Apr. 24, 2013 (FR) .................................... 13 53752

(51) Int. Cl.
*A47K 1/08* (2006.01)
*F16M 13/02* (2006.01)
*B65G 47/86* (2006.01)
*B65G 47/90* (2006.01)

(52) U.S. Cl.
CPC ............. *F16M 13/02* (2013.01); *B65G 47/847* (2013.01); *B65G 47/908* (2013.01); *B65G 2201/0247* (2013.01)

(58) Field of Classification Search
USPC ........ 248/74.2, 103, 113, 312, 313; 294/99.1; 141/2, 129; 198/803.7
See application file for complete search history.

(56) References Cited

U.S. PATENT DOCUMENTS

| | | | | |
|---|---|---|---|---|
| 924,348 A * | 6/1909 | Green | ......................... | 232/41 E |
| 1,282,753 A * | 10/1918 | Carwalho | ..................... | 248/312 |
| 1,414,049 A * | 4/1922 | Shelton | ........................ | 248/113 |
| 1,486,443 A * | 3/1924 | Lutz | ............................. | 248/113 |
| 1,713,415 A * | 5/1929 | Allen | ............................. | 248/312 |
| 1,736,290 A * | 11/1929 | Schiff | ........................... | 248/113 |
| 2,370,876 A * | 3/1945 | Richardson | ..................... | 211/68 |
| 3,155,228 A * | 11/1964 | Norwood | .................. | 198/803.7 |
| 3,161,393 A * | 12/1964 | Swanson | ....................... | 248/113 |
| 3,858,496 A * | 1/1975 | Downers | ........................ | 99/448 |
| 4,211,158 A * | 7/1980 | Rice, Jr. | ......................... | 99/403 |
| 4,651,879 A * | 3/1987 | Harris et al. | ................. | 209/523 |
| 4,681,213 A * | 7/1987 | Winiasz | ..................... | 198/803.9 |
| 4,858,980 A * | 8/1989 | Dreisig et al. | ............... | 294/99.1 |
| 5,465,935 A * | 11/1995 | Wilbs | ........................ | 248/316.3 |
| 5,575,379 A * | 11/1996 | Schmetzer | ................ | 198/803.9 |

(Continued)

FOREIGN PATENT DOCUMENTS

| | | |
|---|---|---|
| DE | 10146118 A1 | 4/2003 |
| DE | 20 2006 004 641 U1 | 9/2007 |
| WO | WO 2009/118579 A1 | 10/2009 |

*Primary Examiner* — Bradley Duckworth
(74) *Attorney, Agent, or Firm* — Muncy, Geissler, Olds & Lowe, P.C.

(57) ABSTRACT

A device for holding a container comprising a stationary jaw and a movable jaw mounted on the stationary jaw to be movable between a closed position for holding the container and an open position for releasing the container. A resilient element connecting the two jaws together to urge the movable jaw towards the closed position. The resilient element is a leaf spring having an end portion secured to the stationary jaw and an end portion secured to the movable jaw in order to carry the movable jaw. A container treatment installation is also provided including at least one such holder device.

13 Claims, 3 Drawing Sheets

(56) References Cited

U.S. PATENT DOCUMENTS

| | | | |
|---|---|---|---|
| 5,607,045 A * | 3/1997 | Hermann Kronseder | 198/476.1 |
| 5,743,377 A * | 4/1998 | Kronseder | 198/803.9 |
| 5,893,700 A * | 4/1999 | Kronseder | 414/744.2 |
| 6,302,172 B1 * | 10/2001 | De Villele | 141/372 |
| 6,692,050 B2 * | 2/2004 | Graffin | 294/104 |
| 6,959,953 B2 * | 11/2005 | Graffin | 294/104 |
| 7,036,785 B2 * | 5/2006 | Moyer et al. | 248/311.2 |
| 7,594,637 B2 * | 9/2009 | Krueger | 248/539 |
| 7,849,998 B2 * | 12/2010 | Langlois et al. | 198/803.9 |
| 7,874,531 B1 * | 1/2011 | Walden | 248/176.1 |
| 8,413,799 B2 * | 4/2013 | Bodtlander | 198/867.02 |
| 8,424,817 B1 * | 4/2013 | Chen | 248/113 |
| 8,424,940 B2 * | 4/2013 | Sarda | 294/99.1 |
| 8,439,413 B2 * | 5/2013 | Cirio | 294/116 |
| 8,602,471 B2 * | 12/2013 | Bodtlander et al. | 294/192 |
| 8,833,824 B2 * | 9/2014 | Fahldieck | 294/90 |
| 9,022,442 B2 * | 5/2015 | Rousseau et al. | 294/90 |
| 2011/0042537 A1 * | 2/2011 | Fahldiek | 248/313 |
| 2013/0139928 A1 * | 6/2013 | Brunee | 141/129 |
| 2013/0299661 A1 * | 11/2013 | Schade | 248/313 |
| 2014/0318079 A1 * | 10/2014 | Gruson | 53/266.1 |

* cited by examiner

CONTAINER HOLDER DEVICE INCLUDING A LEAF SPRING, AND A CONTAINER TREATMENT INSTALLATION INCLUDING SUCH A DEVICE

The invention relates to a container holder device including a leaf spring. The invention also relates to a container treatment installation including such a holder device.

TECHNOLOGICAL BACKGROUND OF THE INVENTION

Container treatment installations are known, such as, by way of example, installations for filling and closing containers, and possibly also for previously washing and rinsing containers, or indeed sterilizing containers. Such installations have a plurality of rotary platforms that are fitted with container holder devices and that are located adjacent to one another so as to define a travel path for the containers through the corresponding installation. Each holder device is arranged to take hold of the body or the rim of a container in order to hold the container during movement of the corresponding platform.

By way of example, there exist holder devices in the form of clamps comprising a stationary jaw and a movable jaw hinged to the stationary jaw via a pivot pin so that the movable jaw pivots between an open position and a position for closing the holder device. A torsion spring or a helical compression spring connects together the two jaws to urge the movable jaw towards the closed position of the holder device. A friction pin is generally provided between the movable jaw and the stationary jaw in order to take up the forces that act on the movable jaw and that could give rise to resistance to pivoting of the movable jaw about the pivot pin.

The holder device is usually opened under the control of a wheel secured to the movable jaw and co-operating with a cam secured to the corresponding platform.

It is necessary for container treatment installations to be cleaned regularly, in particular when they are used for packaging foodstuffs.

Nevertheless, it has been found that dirt and other impurities tend to accumulate in the vicinity of the pin and the spring. Unfortunately, those parts are found to be particularly difficult to clean, particularly if they are not removed completely from the holder device.

In particular, certain installations are fitted with a cleaning circuit having nozzles for spraying a cleaning solution onto the various parts of the installation. Nevertheless, the cleaning circuit is not effective in cleaning the pins and the springs of the clamps unless a large number of nozzles are used that are aimed specifically at the pins and the springs of the holder devices.

That drawback is particularly disadvantageous if the treatment installation is used in the agrifood industry where hygiene standards are particularly strict.

OBJECT OF THE INVENTION

An object of the invention is to provide a holder device that is simple to clean and a container treatment installation fitted with such a holder device.

BRIEF SUMMARY OF THE INVENTION

In order to achieve this object, the invention proposes a holder device for holding a container, which device comprises a stationary jaw and a movable jaw mounted on the stationary jaw to be movable between a closed position for holding the container and an open position for releasing the container, and a resilient element connecting the two jaws together to urge the movable jaw towards the closed position.

According to the invention, the resilient element is a leaf spring having a portion secured to the stationary jaw and a portion secured to the movable jaw in order to carry the movable jaw.

The leaf spring on its own thus enables the movable jaw to move relative to the stationary jaw and serves to return the movable jaw to the closed position. The holder device of the invention thus has fewer parts compared with a holder device of the prior art. The holder device of the invention is thus found to be simpler and quicker to clean.

In addition, the leaf spring is itself easy to clean. The ease of access to all of the portions of the outside surface of the blade and the simplicity of its shape enable the blades to be cleaned quickly and effectively without any need to remove the holder device.

The device of the invention is thus simple to clean. This is particularly advantageous when such a device is used in the agrifood business.

Furthermore, since the leaf spring serves to limit the number of parts in the holder device and thus the number of parts that might become worn or damaged, it makes it possible to increase the lifetime of the holder device.

The leaf spring also makes it possible to have jaws of shapes that are simplified and therefore less expensive to produce and easier to clean.

In a particular embodiment, the stationary jaw has an abutment defining the closed position of the movable jaw. In particular manner, the leaf spring is arranged so that the movable jaw moves in the vicinity of the closed position along a path that is substantially circular about the abutment.

In a particular embodiment, the portions of the stationary jaw and of the movable jaw that are to come into contact with the container extend parallel to each other. In particular manner, the portion of the stationary jaw that is to come into contact with the container extends under the portion of the movable jaw that is to come into contact with the container.

In a particular embodiment, the leaf spring is arranged in such a manner that the movable jaw moves along a path that is substantially circular between the closed position and the open position, the leaf spring also being arranged in such a manner that a bending axis of the leaf spring is parallel to at least one axis of rotation of the movable jaw relative to the stationary jaw.

The invention also provides a container treatment installation comprising at least one platform that includes at least one such holder device.

BRIEF DESCRIPTION OF THE DRAWINGS

The invention can be better understood in the light of the following description of a non-limiting embodiment of the invention given with reference to the accompanying figures, in which.

DETAILED DESCRIPTION OF THE INVENTION

Figure 1:
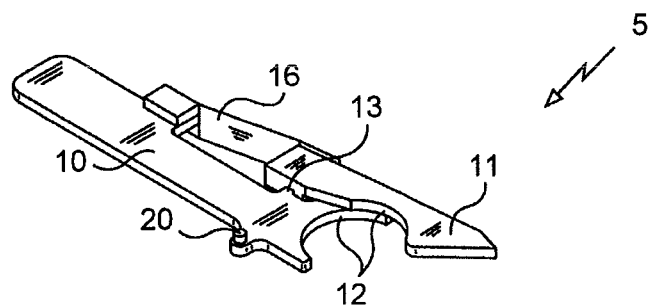
FIG. 1 is a perspective view of a holder device in a first embodiment of the invention, the movable jaw of said device being in the closed position.
Figure 2A:
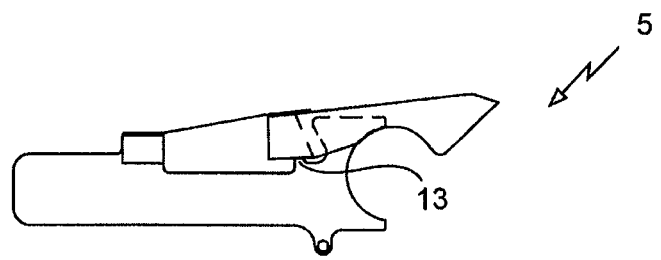
FIGS. 2a, 2b, and 2c are plan views of the device shown in FIG. 1, the movable jaw being shown respectively in the closed position, in an intermediate position, and in the open position.
Figure 2B:
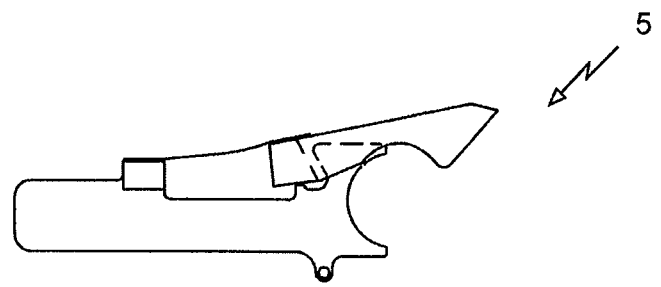
Figure 2C:
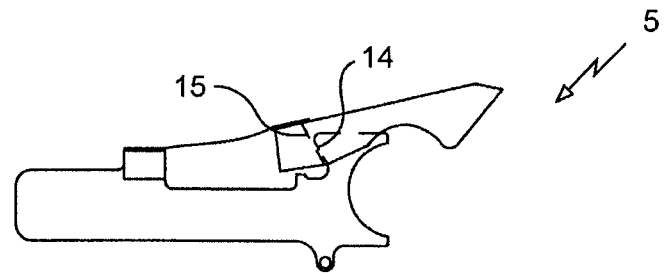
Figure 3A:
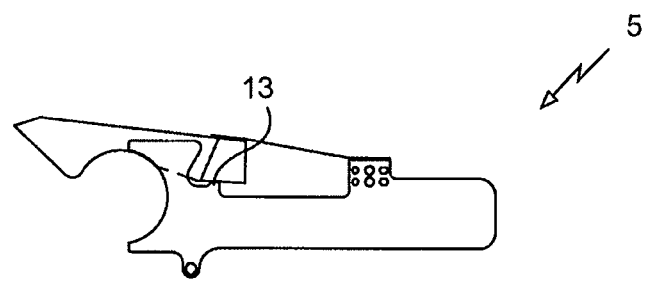
FIGS. 3a and 3b are views from beneath of the device shown in FIG. 1, the movable jaw being respectively in the closed position and in the open position.
Figure 3B:
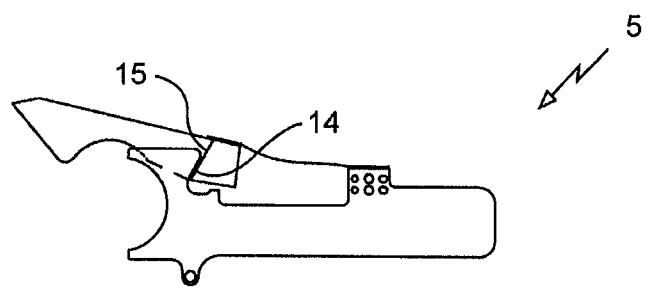
Figure 4:
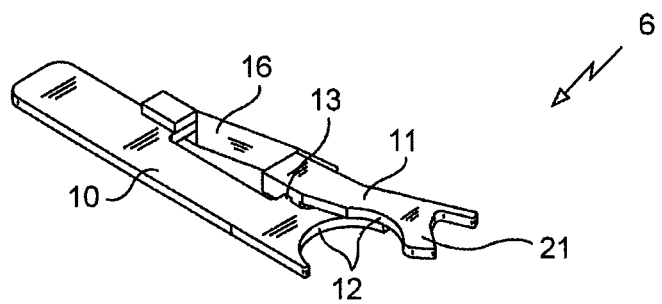
FIG. 4 is a perspective view of a holder device in a second embodiment of the invention, the movable jaw of said device being in the closed position.
Figure 5:
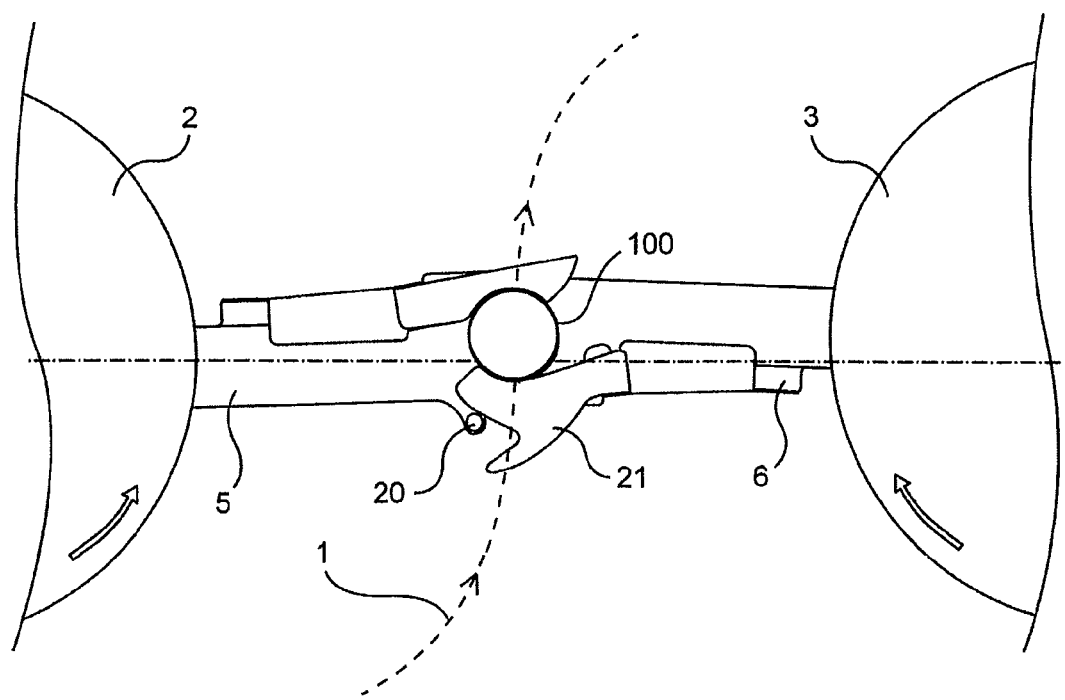
FIG. 5 is a diagrammatic plan view of a container-treatment installation of the invention that is fitted with the holder device shown in FIG. 1 and with the holder device shown in FIG. 4.

With reference to FIG. 5, the container-treatment installation of the invention in this example is for treating containers having a body and a neck, including a collar surmounted by a rim 100.

The installation defines a travel line 1 for the containers and it includes an upstream platform 2 and a downstream platform 3 in succession along the line 1.

The upstream platform 2 has a plurality of upstream holder devices 5 in a first embodiment of the invention (only one upstream holder device 5 is shown in order to avoid overcrowding FIG. 5). The upstream holder devices 5 are used in this example to hold containers via the rims 100 of the containers. The upstream platform 2 may for example be a rotary platform.

In the same manner, the downstream platform 3 has a plurality of downstream holder devices 6 in a second embodiment of the invention (only one downstream holder device 6 is shown in order to avoid overcrowding the figure). In this example, the downstream holder devices 6 hold containers via the rims 100 of the containers. By way of example, the downstream platform 3 is a rotary platform.

Each holder device is preferably fastened to a bottom face of the corresponding platform. The top face of each platform, i.e. the face opposite from the bottom face of that platform, slopes down towards the corresponding holder device. As a result, if any cleaning or sterilizing fluid should be sprayed substantially towards the center of one of the platforms, said cleaning fluid will flow away naturally along the slope of the platform. The cooling fluid will then naturally spill over the edges of the platform onto the respective holder devices.

Thus substantially the entire top face of the platform and a large portion of the holder devices will come into contact with the cleaning fluid. It is thus very simple to clean or to sterilize a large portion of the installation, merely by spraying the fluid to the middle of each of the platforms.

With reference to FIGS. 1, 2a, 2b, 2c, 3a, 3b, and 4, there follows a description of the upstream and downstream holder devices 5 and 6. Elements that are identical or analogous from one embodiment to the other are given the same numerical references.

Each holder device comprises a stationary jaw 10 which, in this example, is made integrally with the corresponding platform.

Each holder device also comprises a movable jaw 11 mounted on the stationary jaw 10 to be movable relative to the stationary jaw 10 between:
- a closed position in which the stationary jaw 10 and the movable jaw 11 define a through section that is smaller than the cross-section of the rim 100 of the container such that in the presence of a container between the jaws of the device, the jaws clamp onto the rim 100 of the container; and
- an open position for releasing the container in which the free end of the movable jaw 11 is moved away from the free end of the stationary jaw 10 so as to define a through section greater than the cross-section of the rim.

Thus, the stationary jaw 10 and the movable jaw 11 do not open symmetrically relative to a radial direction of the corresponding platform: only the movable jaw 11 opens and closes relative to the stationary jaw 10 in order to hold or to release a container.

By way of example, the free end of the stationary jaw 10 and the free end of the movable jaw 11 may be provided with circular cutouts 12 for placing around the container at the rim 100. The term "free end" is naturally used to mean those portions of the jaws that are to clamp onto containers, as contrasted to those portions of the jaws that are connected to the installation or to the other jaw.

The free ends of the stationary jaw 10 and of the movable jaw 11 extend parallel relative to each other. The free end of the movable jaw 11 also extends beneath the free end of the stationary jaw 10.

The stationary jaw 10 and the movable jaw 11 are both oblong in shape.

The movable jaw 11 is preferably arranged so that on passing from the open position to the closed position, the movable jaw 11 exerts a clamping force on the container that is to be held, which force extends towards the center of the rim 100 of the container and in a direction extending transversely relative to the longitudinal direction of the stationary jaw 10.

Thus, the movable jaw 11 exerts a transverse force on the rim 100 and not a clamping force extending in a direction perpendicular to the longitudinal direction of the stationary jaw, thus making it possible to ensure that the rim 100 is held better in the holder device.

The stationary jaw 10 preferably includes a first abutment 13 defining the closed position of the movable jaw 11. In this example, the first abutment 13 is formed directly in one of the side walls of the stationary jaw 10. The first abutment 13 co-operates with a side edge of the movable jaw 11 to stop the movement of the movable jaw 11 relative to the stationary jaw 10.

The stationary jaw 10 preferably includes a second abutment 14 defining the open position of the movable jaw 11. In this example, the second abutment 14 is formed directly in the same side wall of the stationary jaw 10 as the first abutment 13 formed therein. The second abutment 14 co-operates with a shoulder 15 formed in the movable jaw 11 to stop the movement of the movable jaw 11 relative to the stationary jaw 10.

In the invention, each holder device also has a leaf spring 16 having an end portion secured to the corresponding stationary jaw 10 and an end portion secured to the corresponding movable jaw 11 in order to carry the movable jaw 11. The leaf spring 16 thus connects together the two jaws in order both to allow the movable jaw 11 to move relative to the stationary jaw 10, and also to urge the movable jaw 11 towards the closed position. A first end of the leaf spring 16 is thus secured to the movable jaw 11 and the second end of the leaf spring 16 is secured to the stationary jaw 10. The ends of the leaf spring 16 may be secured to the respective jaws by screws, for example.

The leaf spring 16 is preferably arranged in such a manner that the movable jaw 11 can move from the closed position (FIGS. 2a and 3a) to an intermediate position (FIG. 2b) by the movable jaw 11 pivoting about a first center of rotation situated on the first abutment 13, the leaf spring 16 deforming to make this movement possible. The leaf spring 16 is also arranged in such a manner that the movable jaw 11 moves from the intermediate position (FIG. 2b) to the open position (FIGS. 2c and 3b) by the movable jaw 11 pivoting about a second center of rotation that is offset towards the rear of the first abutment 13 and of the free ends of the jaws, the leaf spring 16 deforming even more in order to make this movement possible.

The second abutment 14 is preferably arranged to avoid plastic deformation of the leaf spring 16: when the movable jaw 11 is in the open position, the leaf spring 16 is thus subjected to elastic deformation only. The second abutment 14 is arranged in such a manner that the resultant of a force for opening the movable jaw 11 beyond the open position extends in a direction that is tangential to the leaf spring 16. This ensures that an operator does not deform the leaf spring 16 plastically by attempting to open the holder device too far manually, e.g. during a maintenance operation.

The leaf spring 16 is substantially rectangular in shape. In this example, the leaf spring 16 is of a width that extends perpendicularly to the plane of the jaws 10 and 11, and of a length that extends parallel to a longitudinal direction of the jaws. Thus, the leaf spring 16 is arranged so that the bending axis of the leaf spring 16 is parallel to the axis of rotation of the movable jaw 11 about the first center of rotation and to the axis of rotation of the movable jaw 11 about the second center of rotation.

It may be necessary to place the treatment installation in a controlled-atmosphere enclosure, with a controlled stream of gas then flowing from the ceiling of the enclosure towards the treatment installation. The way the leaf spring 16 is arranged thus makes it possible to ensure that the leaf spring 16 disturbs the flow of this stream very little compared with a leaf spring extending in the same plane as the stationary jaw 10 and the movable jaw 11.

In addition, because of this arrangement of the leaf spring 16, both of the two main faces of the leaf spring 16, i.e. the two faces of the leaf spring having the greatest areas and that are substantially vertical, can be exposed to fluids falling from the top face of the corresponding platform. This is particularly advantageous when the fluid is a cleaning or sterilizing fluid that can then serve to treat both main faces of the leaf spring.

The leaf spring 16 is large in width. The term "large" should be understood to mean that the leaf spring 16 has a width that is greater than one-third of the length of the leaf spring 16.

Thus, the leaf spring 16 can stabilize the movable jaw 11 relative to the stationary jaw 10 more easily, thereby limiting any parasitic movements of the movable jaw 11 relative to the stationary jaw 10, other than movements in rotation of the movable jaw 11 about the two centers of rotation. The leaf spring 16 also makes it possible to omit any friction pin of the kind used in prior art holder devices, where such a friction pin is usually difficult to clean.

According to a particular aspect of the invention, the jaws of the upstream holder device 5 and of the downstream holder device 6 are provided with means enabling them to co-operate so as to enable a container to be transferred in operation from the upstream platform 2 to the downstream platform 3 by the jaws of the upstream holder device 5 co-operating with the jaws of the downstream holder device 6. The upstream holder device 5 and the downstream holder device 6 thus differ from each other in terms of their respective co-operation means.

For example, the co-operation means comprise a peg 20 that is arranged on the stationary jaw 10 of the upstream holder device 5 and a drive finger 21 formed in this example directly by a cutout in the free end of the movable jaw 11 of the downstream holder device 6. The peg 20 and the drive finger 21 are arranged so that co-operation between the peg 20 and the drive finger 21 causes the movable jaw 11 of the downstream holder device 6 to be blocked in the closed position.

When the downstream holder device 6 comes into correspondence with the upstream holder device 5 holding the container, both of the two devices are to be found holding the container via its rim 100. Then as the container moves away from the point of tangency between the upstream and downstream platforms 2 and 3, the pressure exerted by the peg 20 on the drive finger 21 is maintained so that the movable jaw 11 of the downstream holder device 6 remains in the closed position. In the end, it is only the downstream holder device 6 that holds the container.

It is thus the co-operation between the upstream and downstream holder devices 5 and 6 that enables the container to be moved from one platform to another. In a variant, provision may be made for the stationary jaws of the downstream holder device 6 to be fitted with a peg that is arranged to co-operate with a drive finger obtained by forming a cutout in the movable jaw of the upstream holder device in such a manner that the peg pushes against the drive finger so as to force the upstream holder device to open.

The treatment installation of the invention thus makes it possible, advantageously, to omit a wheel-and-cam system of the kind used in prior art installations, where such systems are particularly difficult to clean.

Furthermore, in this example there is no need to connect the movable jaw to the corresponding platform, thereby greatly simplifying the structure of the movable jaw and also of the stationary jaw. The movable jaw 11 and the stationary jaw 10 are thus both generally plane in shape in this example. Furthermore, the movable jaw 11 in this example is relatively short, which means that it is simpler to stabilize and guide by means of the leaf spring 16. The term "relatively short" is used to mean that the movable jaw 11 is of a length lying between half and one-third of the length of the stationary jaw 10.

The holder devices of the invention are thus very simple in structure, and as a result they are inexpensive to produce and they become damaged and dirty relatively slowly compared with prior art devices. They are also very simple to clean.

Naturally, the invention is not limited to the embodiment described and embodiment variants may be applied thereto without going beyond the ambit of the invention as defined by the claims.

In particular, the container treatment installation described is an installation that is extremely simple in order to clarify the description of the invention. Nevertheless, the invention is applicable to installations that are much more complex, such as treatment installations for packaging liquids that include a station for washing or rinsing containers, a sterilization station, a filler station, and a station for closing filled containers.

In addition, the holder devices may serve to hold containers other than via the rims of the containers, for example they may hold the bodies of the containers.

Although the presently described installation of the invention has holder devices in particular embodiments of the invention, the installation could have holder devices comprising only one type of holder device of the invention.

In addition, the holder device may be actuated by means other than by co-operation between a peg and a finger. For example, the co-operation means may comprise a plane projection that is arranged on the stationary jaw of one of the pairs of jaws and a drive finger that is arranged on the movable jaw of the other pair of jaws in such a manner that the projection comes into contact with the drive finger in the vicinity of a point of tangency between the platforms.

In addition, the holder device may be actuated in some other way by co-operation with another holder device. The holder device may thus be opened under the control of a wheel secured to the movable jaw and co-operating with a cam secured to the platform, with closure naturally being ensured by the leaf spring.

In a variant, provision may be made for the holder devices of one upstream platform to have a leaf spring of stiffness that is less than the stiffness of the leaf springs of the holder devices of a downstream platform such that the holder device of the downstream platform pulls the container out from the holder device of the upstream platform. It is even possible to provide for the holder devices of an upstream platform to have leaf springs that extend in a direction relative to the direction in which the corresponding stationary jaw extends that slopes less than the leaf springs of the holder devices of a downstream platform so that the holder device of the downstream platform pulls the container out from the holder device of the upstream platform.

The holder device is preferably made entirely out of metal, in particular when it is for use in a station for decontamination by means of an electron beam.

In a variant, in other applications, the holder device may include parts made of plastics material.

The invention claimed is:

1. A device for holding a container, the device comprising:
   a stationary jaw;
   a movable jaw mounted on the stationary jaw to be movable between a closed position for holding the container and an open position for releasing the container; and
   a resilient element connecting the stationary jaw and the movable jaw together to urge the movable jaw towards the closed position,
   wherein the resilient element is a leaf spring having a portion secured to the stationary jaw and a portion secured to the movable jaw in order to carry the movable jaw.

2. A device according to claim 1, wherein the stationary jaw has an abutment defining the closed position of the movable jaw.

3. A device according to claim 2, wherein the leaf spring is arranged so that the movable jaw moves in the vicinity of the closed position along a path that is substantially circular about the abutment.

4. A device according to claim 3, wherein the leaf spring is arranged so that the movable jaw moves from the closed position to an intermediate position by pivoting about a first center of rotation situated on the abutment, and from the intermediate position to the open position by pivoting about a second center of rotation that is offset to the rear of the first center of rotation and of the portions of the jaw that are to come into contact with the container.

5. A device according to claim 1, wherein the stationary jaw includes an abutment defining the open position of the movable jaw, the stationary jaw and the abutment being arranged in such a manner that the force for opening the movable jaw beyond its open position extends along a direction that is tangential to the leaf spring.

6. A device according to claim 1, wherein the movable jaw is arranged in such a manner as to exert a clamping force when the movable jaw moves from the open position to the closed position relative to the stationary jaw that is directed towards the center of the container to be held and along a direction extending transversely relative to the longitudinal direction of the stationary jaw.

7. A device according to claim 1, wherein the portions of the stationary jaw and of the movable jaw that are to come into contact with the container extend parallel to each other.

8. A device according to claim 7, wherein the portion of the stationary jaw that is to come into contact with the container extends under the portion of the movable jaw that is to come into contact with the container.

9. A device according to claim 1, wherein the leaf spring is arranged in such a manner that the movable jaw moves along a path that is substantially circular between the closed position and the open position, the leaf spring also being arranged in such a manner that a bending axis of the leaf spring is parallel to at least one axis of rotation of the movable jaw relative to the stationary jaw.

10. A container treatment installation including at least one platform having at least one holder device according to claim 1.

11. A treatment installation according to claim 10, wherein the stationary jaw and the platform are made integrally.

12. A treatment installation according to claim 10, wherein the holder device is fastened to a bottom face of the platform, the top face of the platform, opposite from the bottom face of the platform, sloping towards the holder device.

13. A treatment installation, including a first platform and a second platform, each platform having at least one holder device according to claim 1, the jaws of each of the holder devices being provided with co-operation means enabling them in operation to transfer the container from one platform to another by co-operation between the jaws of the holder device of the first platform and the jaws of the holder device of the second platform, the co-operation means being configured so that the jaws of one of the holder devices are capable of acting on the movement of the movable jaw of the other holder device relative to the corresponding stationary jaw.

* * * * *